June 17, 1947.    O. STEINER    2,422,635
CINEMATOGRAPH CAMERA
Original Filed Feb. 20, 1937    3 Sheets-Sheet 1

Inventor
Otto Steiner
by Knight Bros
Attorneys

June 17, 1947.  O. STEINER  2,422,635
CINEMATOGRAPH CAMERA
Original Filed Feb. 20, 1937  3 Sheets-Sheet 2
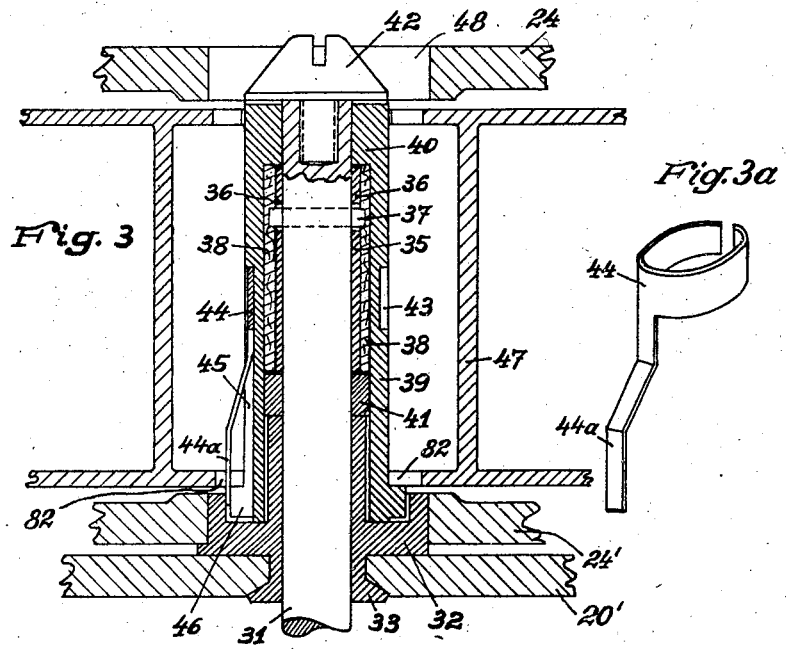
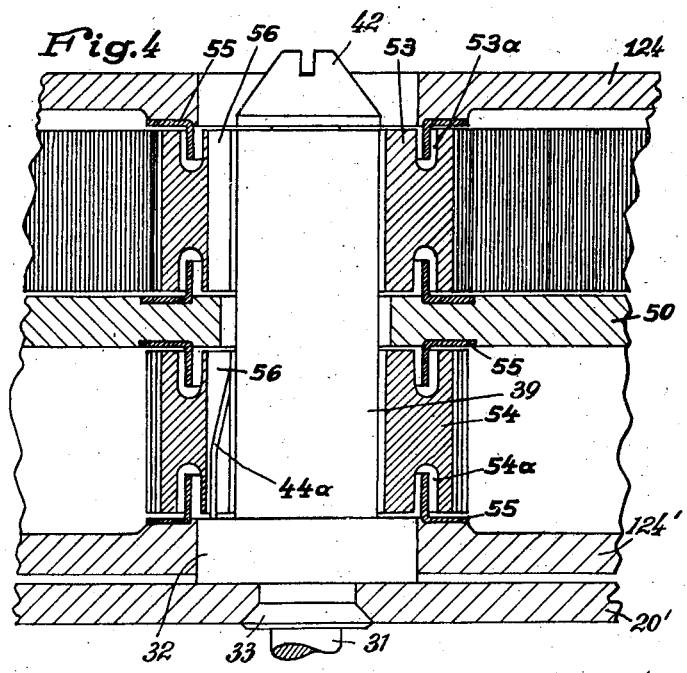

Patented June 17, 1947

2,422,635

UNITED STATES PATENT OFFICE 2,422,635

CINEMATOGRAPH CAMERA

Otto Steiner, Berlin-Spandau, Germany; vested in the Attorney General of the United States Original application February 20, 1937, Serial No. 126,870. Divided and this application December 28, 1938, Serial No. 248,046. In Germany February 22, 1936

Sections 3 and 14, Public Law 690, August 8, 1946.
Patent expires February 22, 1956

5 Claims. (Cl. 242—55)

My invention relates to cinematograph cameras for selective use of exchangeable film magazines, and is a division of my application, Serial No. 126,870, filed February 20, 1937.

An object of my invention is to provide a cinematograph camera which may be used for taking pictures with films of different widths, and which allows changing from one to another width by merely exchanging the film magazine.

Another more particular object of my invention is to provide a film camera which is capable of being supplied with a film having one row of pictures of sub-standard size as well as with a film of double width for taking two rows of pictures.

A further object of my invention is to design the take-up shaft of a film camera in such a way as to prevent overstressing of the film by reliable and space-saving means. An object also is to provide means within the feeding shaft of the camera for preventing an undesired unwinding of the film. More particular objects consist in constructing and arranging the above-mentioned means in such a way as to ensure simplicity and sturdiness and easy handling of the camera mechanism.

According to my invention, a cinematograph camera is provided with different magazines adapted for films of different sizes or of a different number of picture rolls, and the camera as well as the magazines are designed to allow an exchange of the magazines while using the same fitting and coupling means of the camera.

The advantages of such a camera are self-evident. For producing a film of the sub-standard size, it is possible to alternately employ without any loss of time a film already cut to the sub-standard size or a film of the double width which is to be cut into two strips of sub-standard size after the exposure or the developing of the film.

According to the invention, further, the magazine and the spool shafts arranged in the camera are designed in such a manner that either a film spool for films of wider size, or only one of two coaxial spools for films of sub-standard size is coupled with the mechanism of the camera.

The coupling means, provided according to my invention between the camera mechanism and the film spools, are preferably of the resilient type in order to enable the accommodation of magazines containing the spools or the film take-up cores in any relative position of these spools or cores.

Further objects and characteristics of the invention will be apparent from the following description.

In the accompanying drawings are shown some embodiments of my invention in diagrammatic form.

Fig. 3 is a vertical sectional view of the film take-up shaft of the camera, illustrated in the preceding figures.

Fig. 3a shows a spring of the arrangement shown in Fig. 3, in perspective.

Fig. 4 shows the film take-up shaft of Fig. 3 in connection with a double magazine containing two films already cut to the sub-standard size.

Figure 1:
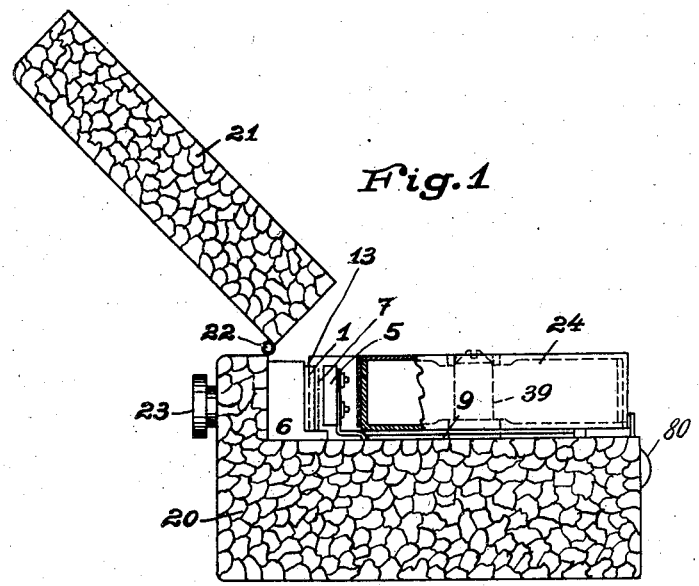
Fig. 1 shows the total view of a cinematograph camera provided with a magazine according to the invention with open camera cover and magazine partly shown in section.
Figure 2:
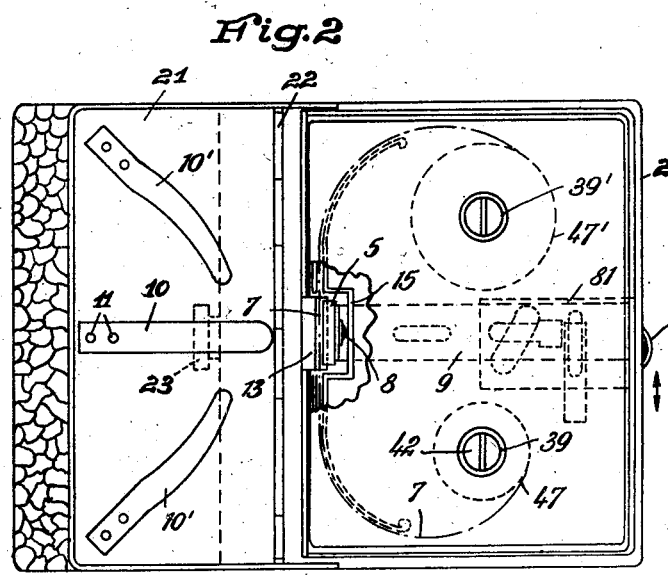
Fig. 2 is a view of the same camera with the magazine viewed from the left-hand side, the magazine cover being partly broken away.

Referring at first to Figs. 1 and 2, the camera and the film magazines are constructed as follows:

The cinematograph camera is designated by the numeral 20, and its objective by the numeral 23. The camera contains a detachable film magazine 24. The chamber for this magazine is covered by a door-like cover 21 hinged to the camera enclosure at 22. The magazine contains two film spools 47 and 47', as indicated in Fig. 2. The film 7, coming from spool 47', is led to the take-up spool 47 so as to pass between a film gate 1 and a pressure plate 5 holding the film against the gate. 39' designates a feed shaft and 39 a take-up shaft forming parts of the camera. The camera contains a mechanism for actuating the take-up shaft 39. The mechanism is disposed in the lower part of the camera enclosure with relation to the view shown in Fig. 1. The wall of the magazine 24 forms a recessed part 15, allowing the pressure plate 5 to catch behind the film when inserting the magazine into the magazine chamber of the camera. During the insertion of a magazine, the feeding shaft 39' and the take-up shaft 39 pass through the axle holes of the spools 47' and 47. In order to limit the lateral clearance of the film 7, a plate spring 10 is secured to the cover 21 by means of rivets 11. Two springs 10', fixed to cover 21, secure the magazine 24 and all parts connected thereto in their proper places.

A knob 80 serves to lock the cover 21 in its closed position, and at the same time to move the pressure plate 5 in the direction of or from the film 7. The pressure plate 5 is resiliently mounted to an angle piece 9. This piece 9 is secured to the camera, so as to be movable axially with reference to the illustration in Fig. 2. A transmission 81 connected to knob 80 and coupled with angle piece 9 causes piece 9 to move back or forth when knob 80 is actuated and moves in the direction of the arrow shown in Fig. 2.

Figure 5:
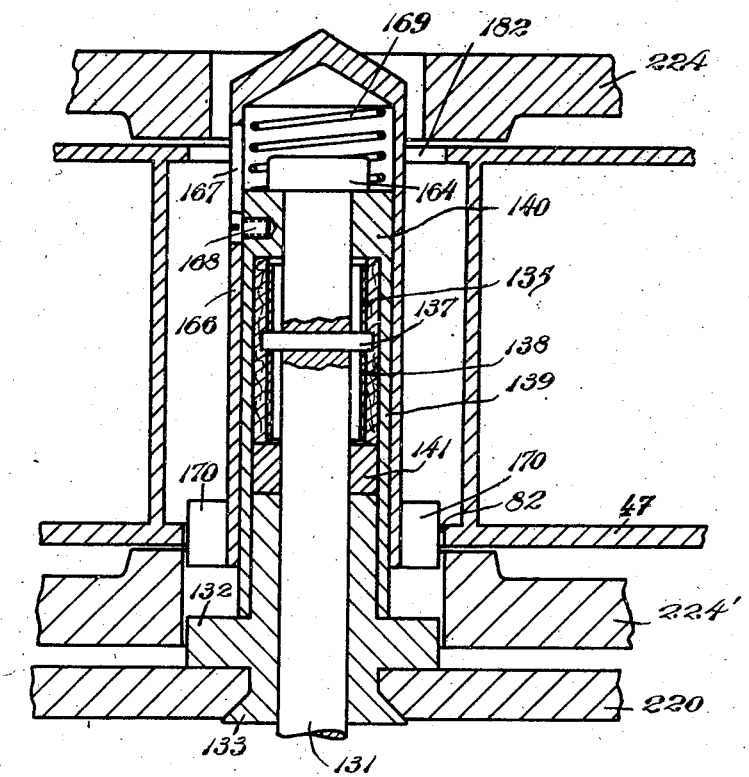
Fig. 5 shows a modified form of the take-up shaft, the shaft being shown in cross section and in connection with a daylight reel for films of a wider size arranged in a magazine.

The take-up shaft 39 consists of a composite structure which, according to the invention, is built up as exemplified in Figs. 3, 4 and 5. In the embodiment shown in Fig. 3, 31 denotes a shaft which forms part of the driving mechanism of the camera. The shaft is guided in a sleeve 32 firmly arranged in a plate 20' of the camera mechanism. Over the shaft 31 is placed a tube 35 of resilient material provided with holes 36 through which a pin 37 passes which is secured in the shaft 31 in order to cause the resilient tube 35 to partake in the rotation of the shaft 31. The purpose of the tube 35 is to press a felt packing 38 against the inner periphery of a sleeve 39 in order to establish between shaft 31 and sleeve 39 a driving connection having a torque of a given upper limit value. The sleeve 39 represents the outer element of the take-up shaft which is recognizable in the total views shown in Figs. 1 and 2, and in the side view of the take-up shaft shown in Fig. 4. The bore of sleeve 39, as apparent from Fig. 3, has near its upper end 40 a restricted diameter fitting the driving shaft 31. The sleeve 39 is also guided by means of a ring 41 filling the space between sleeve 39 and shaft 31. A screw 42 engaged in the upper end of the shaft 31 serves to prevent a displacement of the sleeve 39 in the axial direction.

On the outer periphery of the sleeve 39 a flat circular groove is turned, as indicated at 43, for the reception of the part of a spring 44 bent into a collar.

From this circular groove another groove 45 of constant depth is milled in the sleeve 39 in the longitudinal direction. This groove 45 extends through a collar 46 arranged at the lower end of the sleeve 39 and serves for the reception of an extension 44a of the bent portion of the spring 44. When inserting the film magazine into the camera, the whole part 44a is temporarily bent into the groove 45. Spring 44 and its extension are separately shown in Fig. 3a. These parts serve as a coupling means between the sleeve 39 and a film spool 47 mounted on a take-up shaft and arranged preferably in a magazine or as coupling between the sleeve 39 and a take-up core carrying the film. To this end, the bores of the film spools or take-up cores are provided with grooves 82 into which the spring part 44a catches when inserting a spool. The spool 47 shown in Fig. 3 is designed for films which may be provided with several rows of pictures, for instance for films of 16 mm. width, allowing two rows of pictures to be taken.

The insertion of the magazine into the camera is facilitated by the conical shape of the screw 42. The magazine is placed into its exact position with respect to the camera by bringing the bushing 32 into engagement with a bore arranged in the bottom 24' of the magazine 24 (or with a corresponding bore 48 in the cover of the magazine 24 when the magazine is inverted by turning the same 180°). In this case, the spools 47 and 47' (see Fig. 2), lying in the magazine in a loose state, are at the same time centered within the magazine.

Fig. 4 shows the take-up means of Fig. 3, in case a double magazine is employed, provided with two films of sub-standard size, for instance 8 mm. in width. The magazine is provided with a partition wall 50 and two covers 124 and 124'. Each of the film compartments thus formed contains a take-up core and a feed core. Each of the film feed cores 53 and film take-up cores 54 shown in cross section consists of a tubular body whose circular end surfaces are provided with grooves 53a and 54a respectively. Flanges 55, arranged on the magazine covers 124 and 124' and on the partition wall 50, enter a circular recess 53a and 54a of the cores for preventing the passing of light.

Each of the supply cores and take-up cores is provided at least with a groove 56 by which the take-up core, designed according to Fig. 3, is coupled with the aid of the extension 44a of the spring 44. As will be seen from Fig. 4, this coupling is only effected for either film core and precisely for the film core which must take up the film during the exposure of the same. The supply core 53 lying above the take-up core is not coupled with the take-up shaft.

At the point of the camera from which the film is supplied during its exposure, a simple bolt may be provided on which the supply spool or the supply core rotates. However, it is preferable to provide at this point, also an arrangement according to Fig. 3, in order to prevent an unwinding of the film and, therefore, a loosening of the same.

In Fig. 5 is shown another form of the take-up shaft and the feed shaft in which the coupling between the shaft and the spool is effected in the axial direction.

On the take-up shaft 131 is mounted a resilient expanding ring 135 which presses the felt packing 138 against a bushing 139 and which is continuously rotated by means of a pin 137 traversing shaft 131. The sleeve 139, guided by a reenforcement 140 of the sleeve 139 and by a ring 141, is secured in its axial position on one side by a collar 164 of the shaft 131 and on the other side by a collar 132 of a bushing 133. The bushing 133 is firmly mounted on a wall or plate 220' of the camera, and forms a bearing and guide for the shaft 131.

Another sleeve 166 surrounding sleeve 139 is displaceable in axial direction with respect to sleeve 139, whereas a rotation of the sleeves 139 and 166 with respect to each other is prevented by a pin 168 engaging a longitudinal slot 167 of sleeve 139. A spring 169 normally holds the parts in the position shown. The sleeve 166 is provided with extensions 170 for rotating a film spool 47. This spool is arranged in a magazine, the cover 224 and the bottom 224' of which are shown broken away. The magazine is centered by the collar 132 of the bushing 133 for the shaft 131.

If, when inserting the magazine in the camera, the film spool 47 is placed in such a position with respect to the sleeve 166 that the coupling extensions 170 of the sleeve 166 are not exactly opposite to the corresponding grooves of the reel, the sleeve 166 will be shifted in the axial direction. If now the mechanism of the camera is operated, the shaft 131 is rotated and the sleeve 166 coupled therewith by the friction arrangement 135, 139 causes the teeth 170 to automatically mesh with the grooves 82 of the spool 47 and to enter these grooves under the action of the spring 169.

It is preferable to provide the spool 47 on both of its flanges with different gearings, one of which fits only the teeth 170 of the take-up shaft and the other only the teeth of the feed shaft. In this manner, a rotation of the film spool will be effected only at the take-up side, provided that the spool has been placed in the magazine in the proper position.

Instead of the take-up cores, it is, of course, also possible to employ daylight reels in double magazines for a film of a narrow size. Furthermore, an ordinary magazine of smaller thickness may be provided instead of a double magazine for the narrow film.

The film gate designated by 1 in Fig. 1 and the film guiding means cooperating with the gate, may be constructed in the known manner, according to which these parts are substituted by a set of different parts when changing from a single-row film to a double-row film. It is, however, preferable to construct the film gate and the film guiding means in such a way that they are applicable for all the different films to be used in the camera, and form an integral part of the camera not necessitating exchange when passing from one to another size film. Means of the latter kind are described in my copending application above referred to.

I claim:

1. In a cinematograph camera for the selective use of magazines having spools for single-row films and magazines having double-width spools for double-row films, the combination of take-up drive means comprising a driving shaft arranged so as to pass through the spool of an inserted magazine, a sleeve disposed coaxially on said driving shaft, frictional coupling means operatively interposed between said driving shaft and said sleeve, and coupling means arranged on said sleeve and being resiliently movable relative to said sleeve so as to have the tendency to remain in operative coupling position, said coupling means having a limited axial extent so as to be prevented from establishing a driving connection of said sleeve with more than one of said single-row film spools at a time.

2. Driving structure of a film camera for the selective use of magazines with spools for single-row films and magazines with double-width spools for double-row films, comprising in combination a driving shaft arranged so as to pass through the spool of an inserted magazine, a sleeve disposed coaxially on said driving shaft, a torque-limiting transmission element disposed between said shaft and said sleeve, and a radially projecting resilient coupling member arranged on said sleeve for establishing a driving connection between said sleeve and a film spool to be actuated, said coupling member having a limited axial extent so as to engage only one of two single-row film spools when a magazine for two single-row films is placed over said shaft and sleeve.

3. In a cinematograph camera for the selective use of magazines having spools for single-row films and magazines having double-width spools for double-row films, the combination of take-up drive means comprising a driving shaft arranged so as to pass through the spool of an inserted magazine, a sleeve disposed coaxially on said driving shaft, frictional coupling means operatively interposed between said driving shaft and said sleeve, and a spring member for coupling said sleeve with a film spool, said spring member having a circular portion surrounding said sleeve and an axial extension resilient in radial direction and tending to project from said sleeve, said sleeve having a recess engaged by said spring member to hold said member in its proper place, and said extension being arranged to be prevented from coupling said sleeve with more than one of said film spools at a time.

4. In a cinematograph camera for the selective use of magazines having spools for single-row films and magazines having double-width spools for double-row films, the combination of take-up drive means comprising a driving shaft arranged so as to pass through the spool of an inserted magazine, a sleeve disposed coaxially on said driving shaft, frictional coupling means operatively interposed between said driving shaft and said sleeve, and coupling means arranged on said sleeve for establishing a driving connection with a film spool placed over said sleeve, said latter coupling means having a radial projection for engaging said spool and being resiliently movable in the axial direction of said sleeve.

5. In a cinematograph camera for the selective use of magazines having spools for single-row films and magazines having double-width spools for double-row films, the combination of take-up drive means comprising a driving shaft arranged so as to pass through the spool of an inserted magazine, a sleeve disposed coaxially on said driving shaft, frictional coupling means operatively interposed between said driving shaft and said sleeve, a second sleeve surrounding said first sleeve and being non-rotatable but axially displaceable relative to said first sleeve, a coupling element of limited axial extent provided on said second sleeve for engaging a spool to be actuated, and a spring tending to hold said second sleeve and said element in operative coupling position.

OTTO STEINER.

REFERENCES CITED

The following references are of record in the file of this patent:

UNITED STATES PATENTS

| Number | Name | Date |
|---|---|---|
| 2,008,033 | Nystrom | July 16, 1935 |
| 1,937,354 | Morsbach | Nov. 28, 1933 |
| 2,028,608 | Howell | Jan. 21, 1936 |
| 1,935,572 | Leventhal | Nov. 14, 1933 |
| 2,123,495 | Becker | July 12, 1938 |
| 2,022,353 | Kindelmann et al. | Nov. 26, 1935 |
| 2,026,960 | Branch | Jan. 7, 1936 |
| 2,005,404 | Wittel | June 18, 1935 |
| 1,946,600 | Tondreau | Feb. 13, 1934 |
| 2,216,463 | Steiner | Oct. 1, 1940 |

FOREIGN PATENTS

| Number | Country | Date |
|---|---|---|
| 274,528 | Great Britain | July 18, 1927 |